United States Patent [19]

Jyojiki et al.

[11] 4,223,988
[45] Sep. 23, 1980

[54] CAMERA HAVING A FOCUSING DEVICE

[75] Inventors: Masao Jyojiki, Saitama; Kazuo Nakamura, Asaka, both of Japan

[73] Assignee: Asahi Kogaku Kogyo Kabushiki Kaisha, Japan

[21] Appl. No.: 907,771

[22] Filed: May 19, 1978

Related U.S. Application Data

[63] Continuation-in-part of Ser. No. 887,662, Mar. 17, 1978, Pat. No. 4,171,155.

[30] Foreign Application Priority Data

May 20, 1977 [JP] Japan .................................. 52-57686

[51] Int. Cl.³ .............................................. G03B 3/10
[52] U.S. Cl. ..................................................... 354/25
[58] Field of Search ................. 354/25, 31, 60 A, 195, 354/198, 199; 352/140; 355/56

[56] References Cited
U.S. PATENT DOCUMENTS

| | | | |
|---|---|---|---|
| 3,596,101 | 7/1971 | Someya et al. | 354/140 X |
| 4,083,056 | 4/1978 | Nakamura et al. | 354/25 |

Primary Examiner—Michael L. Gellner
Attorney, Agent, or Firm—Steinberg & Blake

[57] ABSTRACT

A single lens reflex camera including an objective having an optical axis for focusing an image of an object and a device for determining when the objective has properly focused an image at an image plane which is located at a position which is optically equivalent to the location of the film plane, the latter including an image-forming device including a first refracting device for receiving an image from the objective and for providing at least a pair of identical images of the object to be photographed at the image plane, a detecting plane provided along the optical axis having a pair of identical photosensitive detectors, each of which provides an output which varies as the image is moved longitudinally therealong and an image-transmitting device situated at least in part at the image plane which includes a second refracting device for receiving the images from a first refracting device and for participating in the transmission thereof to the detecting plane in a manner according to which the identical images simultaneously move equally in opposite directions along the pair of detectors in response to adjustment of the objective.

13 Claims, 26 Drawing Figures

CAMERA HAVING A FOCUSING DEVICE

CROSS REFERENCE TO RELATED APPLICATION

This application is a continuation-in-part of application Ser. No. 887,662, filed Mar. 17, 1978, now Pat. No. 4,171,155.

BACKGROUND OF THE INVENTION

The present invention relates to camera focusing devices.

It has already been proposed to provide for detection of proper focus of a camera from the knowledge that various factors such as contrast, spatial frequency, and luminance of an object to be photographed vary in accordance with the accuracy of focusing. Thus, it is known according to one prior art procedure to utilize for this purpose photosensitive elements such as cadmium sulfide elements having specific contrast-responsive characteristics. However, this latter procedure has a considerable disadvantage in that it is difficult to prepare the elements with uniform photoresponsive characteristics, and in addition the output variation of such photosensitive elements before and after the properly focused position is too low to achieve an exact detection insofar as detection of proper focusing at low luminance is concerned.

A second type of known focusing expedient utilizes a photoelectric output signal obtained by oscillating or rotating an optical member in a mechanical manner. This type of procedure also has a considerable disadvantage in that mechanically movable parts are required and thus miniaturization of a camera is prevented while at the same time the required power consumption is increased. A third type of expedient utilizes two outputs from two sets of photodetective members arranged at different positions in the same way as in a so-called coupled range-finding camera. This third expedient also has a disadvantage in that with such an arrangement it is extremely difficult to provide for interchangeable lenses.

SUMMARY OF THE INVENTION

It is accordingly a primary object of the present invention to provide a construction according to which it becomes possible to indicate when a camera is properly focused while avoiding the above disadvantages.

Thus, it is an object of the present invention to provide a structure of the above type which will meet required miniaturization of the optical system while at the same time maintaining a high degree of precision as well as appropriate operation under conditions of low luminance with the operation having only a low power consumption in a manner which has not been achieved by previously known devices.

In addition, it is an object of the present invention to provide a focusing device which does not require the use of a semitransparent mirror as part of the focusing device, so that in this way also it is possible to provide an assembly which is extremely compact, as well as achieving other advantages referred to below.

The basic concept of the present invention resides in improving a photoelectric focusing detector by utilizing imagerefracting structure in the form of prisms of suitable configuration.

According to the invention a single lens reflex camera has an objective means provided with a first optical axis for focusing an image of an object which is to be photographed in a film plane which is normal to this first optical axis. A semitransparent reflector means extends across this first optical axis for reflecting an image of the object which is to be photographed to a viewfinder means, this semitransparent reflector means being situated between the objective means and the film plane. A lightdeflecting means is situated behind the reflector means between the latter and the film plane for deflecting light travelling through the semitransparent reflector means from the first optical axis to a path extending along a second optical axis which branches from the first optical axis. A device for determining when the objective means has properly focused an image at the film plane includes an optical system which is situated at least in part along this second optical axis, this device including along the second optical axis an image plane normal to the second optical axis and having at the second optical axis a location which is optically equivalent to the location of the film plane along the first optical axis. This optical system includes in advance of the image plane at least at one of the above optical axes an image-forming means for forming at the image plane at least a pair of identical images of the object which is to be photographed, and the optical system has beyond the image plane along the second optical axis a detecting plane also normal to the second optical axis. At this detecting plane there are at least a pair of identical elongated photosensitive detecting means which have respectively optically equivalent positions with respect to the second optical axis, and each detecting means provides an output which varies as an image is moved longitudinally along each detecting means. The optical system includes an imagetransmitting means situated at least in part at the image plane for transmitting the images provided by the image-forming means at the image plane to the detecting plane in a manner according to which these images are simultaneously moved equally and oppositely along the pair of detecting means in response to adjustment of the objective means to focus an image at the film plane. The pair of detecting means provide equal outputs when the images at the pair of detecting means are respectively situated at identical positions with respect thereto and different outputs when the images at the pair of detecting means are respectively situated at different positions with respect thereto. The image transmitted by the objective means to the film plane is properly focused at the film plane when the pair of images at the pair of detecting means are respectively at the same positions with respect thereto. An indicating means is operatively connected with the pair of elongated detecting means for indicating when the identical images transmitted to the pair of elongated detecting means are respectively situated at identical positions therealong, so as to thus indicate when the objective means has been set to focus an image properly at the film plane.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
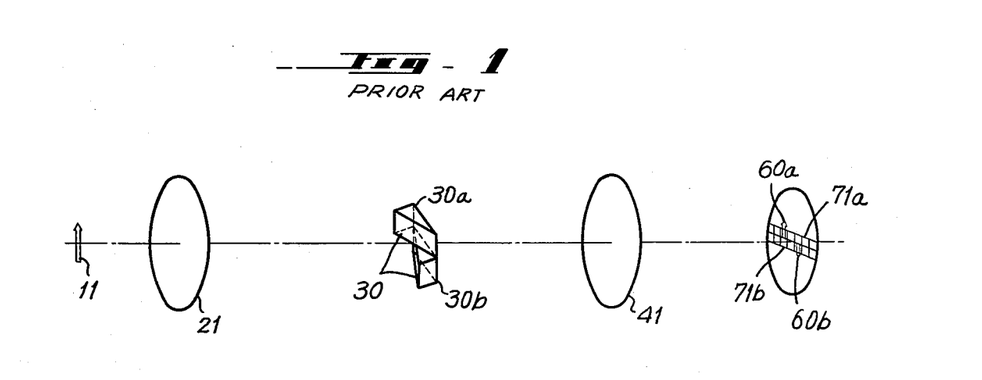
FIG. 1 is a schematic illustration of a prior art system for detecting proper focusing.

Referring first to the prior art arrangement of FIG. 1, there is illustrated therein an optical system for providing detection of proper focusing. With this known arrangement of FIG. 1 there are split portions 60a and 60b of an image, these split image portions being obtained by way of a split prism 30 which has the illustrated oppositely directed identical prism portions 30a and 30b. The split prism 30 is situated at the focal plane of the objective 21. Thus the image of the object 11 which is to be photographed is transmitted by the objective 21 to the split prism 30, and the image split thereby is then transmitted by a projector lens 41 onto a pair of photosensitive element arrays 71a, 71b. When the pair of image portions 60a and 60b are aligned with each other, then there is an indication of proper focusing and in theory the difference between the outputs of the arrays 71a and 71b will be zero.

This known arrangement of FIG. 1 forms a so-called electronic focusing detector in which the mutual alignment of the split image portions, or in other words the upper and lower image portions as viewed in FIG. 1, is detected in an electronic manner.

Figure 2A:
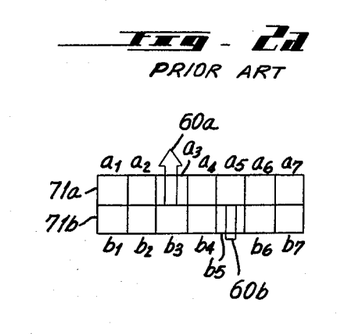
FIGS. 2a and 2b respectively illustrate how the structure of FIG. 1 operates.
Figure 2B:
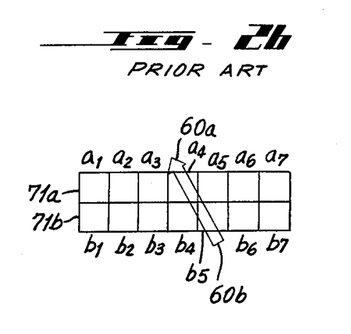

As may be seen from FIGS. 2a and 2b, the elements forming the array 71a respectively have the outputs $a_1$, $a_2$, ... $a_7$, while the elements forming the array 71b respectively have the outputs $b_1$, $b_2$, ... $b_7$.

As may be seen from FIG. 2a, for example, the split image portions 60a and 60b, projected by way of the split prism 30 onto the pair of photosensitive element arrays 71a and 71b, are out of mutual alignment, so that there is an indication that proper focusing has not been achieved. Thus, this arrangement of FIG. 2 will provide a relationship $$\sum_{k=1}^{7} |a_k - b_k| \neq 0 \tag{1}$$

On the contrary, when proper focusing has been achieved, the upper and lower image portions are aligned with each other and in this way there is established a relationship expressed by:

$$\sum_{k=1}^{7} |a_k - b_k| = 0 \tag{2}$$

In this way it is possible to determine when proper focusing has been achieved by adjusting the optical system until the difference between the outputs of the photosensitive element arrays 71a and 71b reaches zero.

However, with the above arrangement which is known it is possible that the difference between the outputs of the arrays 71a and 71b will not be zero, in accordance with formula (1) above, even under conditions where the upper and lower image portions are accurately aligned with each other, inasmuch as the areas of both photosensitive element arrays 71a, 71b, occupied by the split image portions, are different. For example when the image portions are obliquely positioned as indicated in FIG. 2b, then even though the image portions are accurately aligned different areas of the two arrays will be occupied by the image portions shown in FIG. 2b. Thus because of the oblique positioning of the aligned image portions in FIG. 2b, different outputs will be provided by the elements of the arrays 71a and 71b.

Thus, with the above arrangement it is not possible to achieve an exact detection of focusing in an electronic manner when the image portions are obliquely oriented. Such disadvantage is encountered by the above known arrangements even with respect to image portions which are positioned in an upright manner as shown in FIG. 2a, under conditions where hand trembling occurs during operation of the focus adjustment.

The above drawback encountered with the known arrangement of FIG. 1 results basically from the fact that the two arrays 71a and 71b of photosensitive elements are separately exposed to two different portions 60a and 60b of the image of the object which is to be photographed, respectively. In other words the single image of the object which is to be photographed is split into separate portions which are separately detected by the arrays 71a and 71b.

In order to avoid this drawback, the image of the object which is to be photographed may be formed, as by splitting, into two identical images to which the two arrays of photosensitive elements are respectively exposed, and the focusing may be detected depending upon whether there is a difference of output from the two arrays of the photosensitive elements, in other words by detecting whether the difference between the outputs is zero or not.

In order to split one and the same object image into two or more identical images, it has been conventional to use a semitransparent mirror. However, with such an arrangement the optical axis is split into two or more axes and thus the construction becomes undesirably large. Moreover, the luminous flux or light intensity coming from the object to be photographed is polarized by the semitransparent mirror, with the result that the two split images often will have differences in their luminance or brightness. In the third place, it is practically difficult to manufacture a semitransparent mirror with transmissivity, reflectivity and splitting characteristics so strictly predetermined as to meet the essential requirement that the difference between the luminance of the two images achieved by the semitransparent mirror will be zero. In the fourth place, the ability of detecting proper focus under conditions of low luminance is relatively reduced inasmuch as a semitransparent mirror is subject to considerable loss of luminance. In the fifth place, use of a semitransparent mirror renders it difficult to locate two photosensitive element arrays at positions which are optically equivalent to each other. Thus, for all of the above reasons it is practically inexpedient to utilize a semitransparent mirror in order to split an image of an object into a pair of identical images, and in the event that a semitransparent mirror is used for such a purpose the split images which are achieved are difficult to compare with respect to their luminance so as achieve the desired detection of proper focusing.

In contrast, the focusing detector according to the present invention is characterized by the manner in which the object image is split without using a semitransparent mirror having the above disadvantages. With the structure of the invention an exact detection of focusing is achieved.

Figure 3:
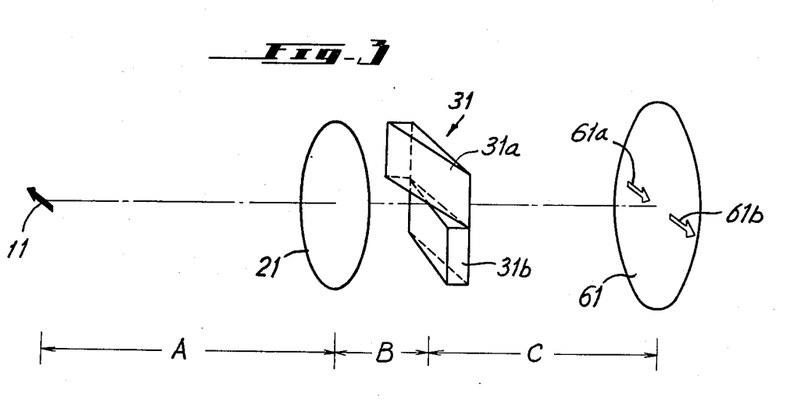
FIG. 3 is a schematic illustration of part of a system according to the present invention.
Figure 4A:
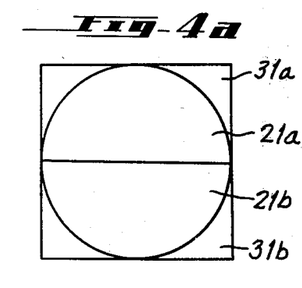
FIG. 4a schematically shows how the structure of FIG. 3 appears when viewed from the left.
Figure 4B:
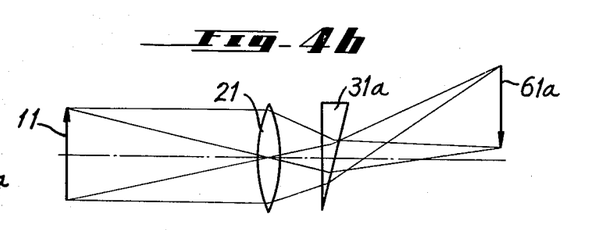
FIGS. 4b and 4c respectively illustrate how the upper and lower portions of FIG. 4a operate to provide a pair of separate images.
Figure 4C:
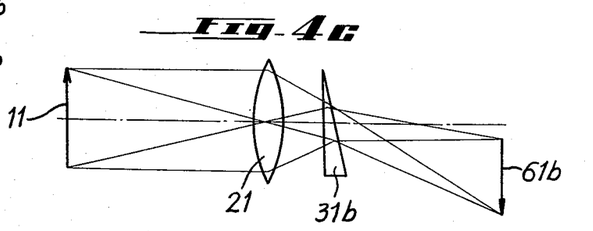
Figure 5:
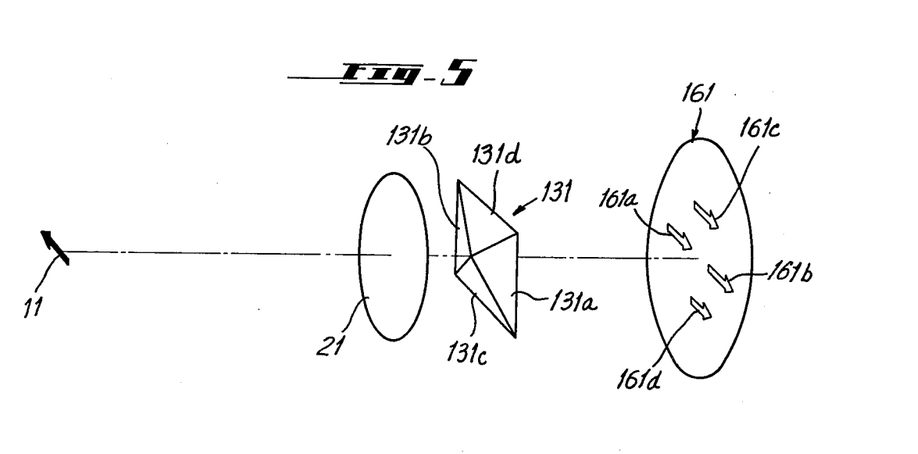
FIG. 5 is a schematic illustration of a variation of the structure shown in FIG. 3.

FIGS. 3-5 illustrates the principle of operation of a light path splitter forming part of the device of the present invention. This light path splitter includes the objective means 21 and the split prism units 31a and 31b located along the optical axis of the objective means 21 where the light travels from the object 11 which is to be photographed and a plane 61 in which a primary image of the object is formed by the objective 21 situated in advance of the primary image forming plane 61. The split prism units 31a and 31b are arranged, as illustrated in FIG. 3, in such a way that their respective sharp ends or edges are oppositely directed. Thus, as illustrated in FIG. 3, the elongated prisms 31a and 31b have opposed ends one of which is at the thickest part of the prism and the other of which is in the form of a sharp edge, and these ends of the prisms are oppositely arranged as illustrated.

FIG. 4a shows how the structure of FIG. 3 appears from the left with the objective means 21 situated in front of the split prism units 31a and 31b, FIG. 4a showing the structure as it appears when looking along the optical axis toward the objective means 21. Thus, the light or luminous flux which travels through the upper half 21a of the objective 21 passes through the upper prism unit 31a while the luminous flux or light travelling through the lower half 21b of the objective 21 passes through the lower prism unit 31b. The respective prism units 31a and 31b of course reduce the luminance of the object image by half, but nevertheless they split the single image provided by way of the objective 21 into a pair of identical perfect images.

FIG. 4b shows how the upper prism unit 31a provides from the object 11 the image 61a while FIG. 4c illustrates how the lower prism unit 31b provides from the object 11 the other image 61b. FIGS. 4b and 4c are thus plan views illustrating how this structure operates.

Thus it is apparent that the refracting means formed by the assembly of prism units 31a and 31b forms an image-forming means for forming at the image plane 61 a pair of images 61a and 61b of the object 11 the image of which is transmitted by the objective means 21 to the image-forming means 31a, 31b. In FIG. 3 the distance A designates the distance between the object 11 which is to be photographed and the objective means 21. The distance B designates the distance between the objective means 21 and the image forming means formed by the split prism units 31a and 31b. The distance C designates the distance between the image forming means 31a, 31b and the primary image plane 61 in which the pair of images 61a and 61b are formed. Assuming that the objective means 21 has a focal length or distance of $f_{(21)}$ while the prism units 31a and 31b respectively have refraction angles $\alpha_{31a}$ and $\alpha_{31b}$, then both of the images 61a and 61b are formed in the image plane 61 with a spacing therebetween of $C(\tan\alpha_{31a}+\tan\alpha_{31b})$. These two images 61a and 61b occupy positions which are optically equivalent to each other, or in other words which are optically equivalent with respect to the optical axis. Furthermore, a relationship is established which is approximately expressed by $$1/A+1/(B+C)=1/f_{(21)} \qquad (3)$$

As is indicated in FIG. 5, instead of utilizing for the image forming means the refracting means 31a, 31b, it is possible to utilize a refracting means in the form of a pyramidal prism, and FIG. 5 shows such a pyramidal prism 131 situated between the image plane 61 and the objective means 21 at the same location as the prism units 31a, 31b of FIG. 3. This pyramidal prism 131 has the four separate prism portions 131a–131d, and since the location of the pyramidal prism 131 is optically equivalent to the position of the prism portions 31a, 31b of FIG. 3, the object which is to be photographed is split by such a construction into four images 161a–161d which are situated at the image plane 61 in the manner shown in FIG. 5, in accordance with the principle of image splitting explained above in connection with the prism 31a, 31b. This pyramidal prism 131 may include at least a single pyramid in order to split the object image, and the number of photosensitive element arrays as well as the number of members forming the electronic processing circuit will be set to correspond to the number of images which are formed by the image-forming means 131. Prism units having different degrees of refraction or different directions of refraction may be cemented together so as to obtain a desired split prism in the same way as in connection with the split prism 31, and in addition these factors may be selected so as to reduce chromatic dispersion.

Figure 6:
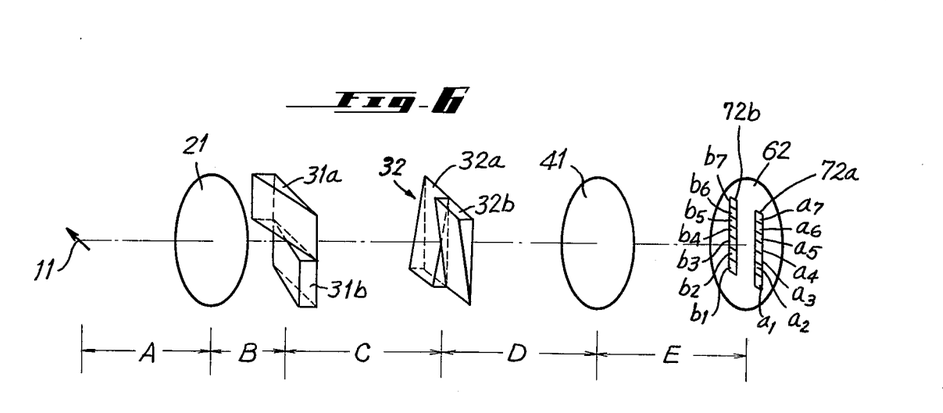
FIG. 6 is a schematic illustration of how the structure of FIG. 3 is incorporated into a complete system according to the invention for detecting proper focus of a camera objective.

The basic concept of the device of the invention is illustrated in FIG. 6 in a schematic manner. The arrangement of the object means 21 and the split prism units 31a and 31b correspond in FIG. 6 to the arrangement shown in FIG. 3 and described above. In FIG. 6 the prisms 31a, 31b form a first refracting means which serves as an image-forming means for forming at the image plane images of the object 11. However, in FIG. 6 there are situated at the image plane a second set of split prism units 32a, 32b which form a second refracting means, and this second refracting means forms part of an image transmitting means for transmitting the images formed by the prism units 31a, 31b to a detecting plane 62 referred to below. Thus, the second refracting means 32a, 32b is situated at the primary image plane 61 referred to above in connection with FIG. 3. These prism units 32a, 32b, which may be identical with the prism units 31a, 31b, are arranged so as to have refractive directions which deviate from those of the prism units 31a, 31b by 90°, respectively. The image-transmitting means for transmitting the images from the image plane to the detecting plate 62 includes in addition to the refracting means 32a, 32b projector lens 41 located in the path of light travel from the second refracting means 32a, 32b to the detecting plane 62. It will be seen that although the prism units 32a, 32b are angularly displaced with respect to the prism units 31a, 31b by 90°, nevertheless these units 32a, 32b are also arranged so that they are oppositely directed with their sharp end edges respectively oriented oppositely as illustrated in FIG. 6. At the detecting plane 62 there are a pair of detecting means respectively formed by the arrays 72a and 72b which may be identical with those described above in connection with FIGS. 2a and 2b. Thus these arrays 72a, 72b form at the detecting plane 62 a pair of elongated photosensitive detecting means which respectively have optically equivalent positions with respect to the optical axis shown in FIG. 6.

In FIG. 6 the distance D designates the distance between the prisms 32a, 32b and the projector lens 41, the distance E designates the distance between the projector lens 41 and the detecting plane 62 which receives secondary images transmitted by the image-transmitting means which includes the refracting means formed by the prisms 32a, 32b and the projector lens 41. Of course, the distance E is also the distance between the projector lens 41 and the photosensitive arrays 72a, 72b. Assuming that the projector lens has a focal distance or length $f_{(41)}$, then there is established the relationship expressed by $$1/D + 1/E = 1/f_{(41)} \quad (4)$$

Thus, the first refracting means 31a, 31b forms from the image received from the objective means 21 a pair of primary images situated at the image plane where the second refracting means 32a, 32b is situated, and by way of this second refracting means and the projector lens 41 the primary images are transmitted to the detecting plane 62 in the form of secondary images. These secondary images will respectively fall upon the pair of elongated detecting means formed by the photosensitive arrays 72a, 72b.

Thus, the pair of photosensitive element arrays 72a and 72b respectively receive secondary images. The respective photosensitive elements $a_1, \ldots a_7$, as well as the photosensitive elements $b_1, \ldots b_7$, which form the pair of photosensitive element arrays 72a, 72b, respectively, have identical shapes and areas with corresponding pairs of these elements such as $a_1$ and $b_1$, $a_2$ and $b_2$, $\ldots a_7$ and $b_7$ taking positions which are optically equivalent to each other, respectively. Thus, these photosensitive elements of the pair of detecting means 72a and 72b are linearly arranged in two arrays. When the conditions according to the above formulae (3) and (4) are established, the respective pairs of photosensitive elements $a_1$ and $b_1$, $a_2$ and $b_2$, $\ldots a_7$ and $b_7$, detect identical images respectively.

Considering now the operation of the arrangement of the invention which is shown in FIG. 6, although adjustment of focus is usually carried out by advancing or retracting the objective 21 with respect to the object which is to be photographed, in a practical application of the photographic camera, a particular case is considered in connection with FIG. 6 solely for convenience of explanation, this particular case being one where the focal point of the objective means 21 is fixed while the object which is to be photographed is displaced with respect thereto along the optical axis of the objective means 21. In such a case, the image plane in which the primary images are formed, this being the plane occupied by the second refracting means 32a and 32b, the images being formed at this image plane by the first refracting means 31a, 31b which receives the image from the objective means 21, is displaced relative to the split prism units 32a, 32b along the optical axis. From the above formula (3), this displacement of the primary image plane relative to the split prisms 32a, 32b may be expressed by $$(1/(A+l) = 1/f_{(21)})^{-1} - (B+C) \quad (5)$$

where l represents the displacement of the object to be photographed. When the image forming location or position is thus displaced relative to the split prism units 32a, 32b, the resulting images are deviated by these split prism units 32a, 32b in proportion to the extent to which the solution to the above formula (5) is provided.

FIGS. 7a-7e illustrate various possibilities with respect to the images which are situated along the pair of detecting means 72a, 72b. These detecting means of course receive the secondary images 62a, 62b which are projected onto the pair of elongated detecting means in the manner described above. The object image 62a is deviated or displaced along the detecting means 72a by way of the prism unit 32a by an amount expressed as $$\Delta\chi \tan\alpha_{32a} \quad (6)$$

where $\alpha\chi$ represents the solution of the formula (5). If $\alpha\chi$ is sufficiently small relative to D and E, deviation along the associated array of photoresistive elements may approximately be given as $\Delta\chi \tan_{32a} E/D$. Accordingly, the images 62a, 62b projected by the projector lens 41 onto the arrays of photosensitive elements, respectively, will become vertically aligned with each other on these arrays 72a, 72b, as viewed in FIG. 7a, when the image plane is at a location coinciding with the plane occupied by the split prism units 32a, 32b. The respective pairs of photosensitive elements $a_1$ and $b_1$, $a_2$ and $b_2, \ldots; a_7$ and $b_7$ take positions which are optically equivalent to each other, respectively, relative to the object to be photographed, and the images 62a, 62b are optically identical to each other. When the images $\beta a$, 62b are projected equally onto each pair of corresponding photosensitive elements as illustrated in FIGS. 7a, a sum of the absolute values of the output differences $a_1-b_1, a_2-b_2, \ldots, a_7-b_7$ of the respective pairs of photosensitive elements becomes equal to zero, namely, $$\sum_{k=1}^{7} |a_k - b_k| = 0.$$

Figures 7A, 7B:
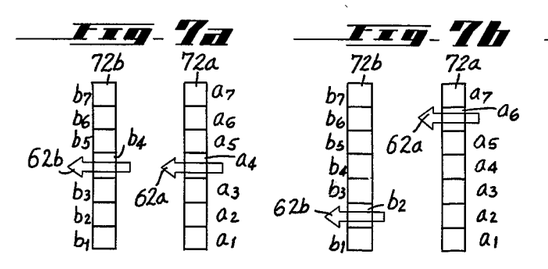
FIGS. 7a-7e respectively illustrate different types of operations which can be achieved with the structure of FIG. 6.
Figure 7C:
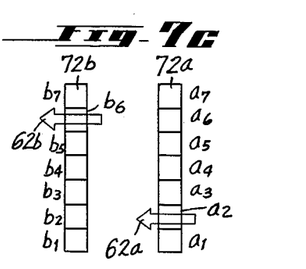

However, when the primary image plane does not coincide with the location of the plane occupied by the split prisms units 32a, 32b, the images on the photosensitive element arrays 72a, 72b also are out of vertical alignment as shown in FIGS. 7b and 7c, and under these conditions the sum of the absolute values is not zero, namely $$\sum_{k=1}^{7} |a_k - b_k| \neq 0.$$

Figures 7D, 7E:
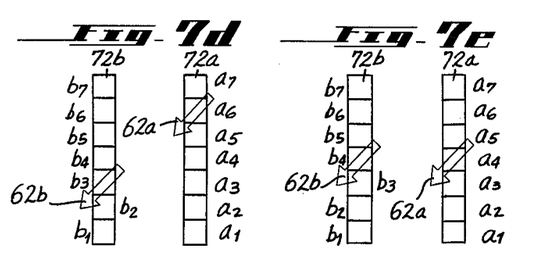

Considering now the situation where the object which is to be photographed has an oblique orientation with respect to the photosensitive element arrays forming the pair of detecting means 72a, 72b, then it will be seen that the images 62a, 62b will not extend perpendicularly across the pair of detecting means in the manner shown by the representative arrows in FIGS. 7a–7c. Under these conditions when the image plane in the above example does not coincide with the plane occupied by the split prism units 32a, 32b which form the second refracting means, the oblique images 62a, 62b are out of vertical alignment or in other words are at different elevations along the pair of detecting means, as indicated in FIG. 7d, so that under these conditions the absolute sum of the output differences of the respective pairs of corresponding photosensitive elements is not zero. However, when the image plane which receives from the first refracting means 31a, 31b is in coincidence with the second refracting means 32a, 32b, then the identical images projected onto the respective pairs of corresponding photosensitive elements of the pair of detecting means 72a, 72b will be situated at precisely the same locations at the respective corresponding pairs of photosensitive elements in the manner shown in FIG. 7e, so that under these conditions even though the images are obliquely oriented nevertheless the absolute sum of the output differences of the respective pairs of corresponding photosensitive elements becomes zero.

As a consequence, $$\sum_{k=1}^{7} |a_k - b_k| = 0$$

in rightly focused condition while $$\sum_{k=1}^{7} |a_k - b_k| \neq 0$$

in not rightly focused condition, insofar as the split prism units 32a, 32b are situated in a plane which is optically equivalent to the film plane. Thus, such relationships may be utilized for detection of accurate focusing.

Figure 8A:
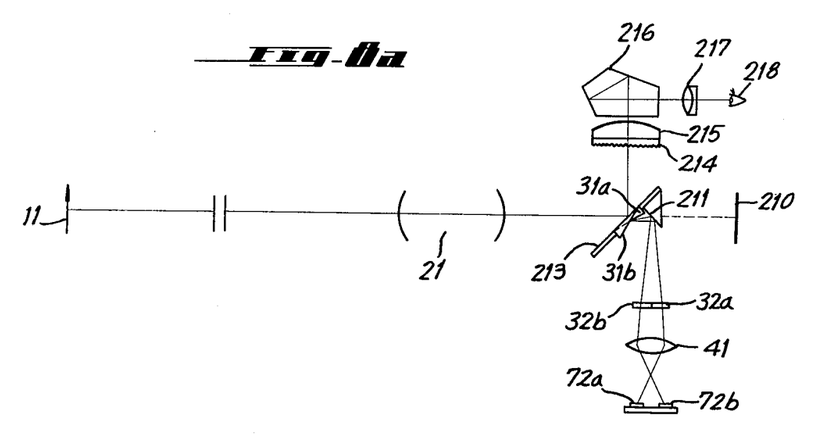
FIG. 8a is a schematic illustration of one possible arrangement according to the invention for indicating proper focus of an objective.

Referring now to FIG. 8a, there is illustrated therein an embodiment of the invention which incorporates the abovedescribed principles of the present invention into a single lens reflex camera. Thus, in FIG. 8a the illustrated optical arrangement of the objective means 21, the split prism units 31a, 31b and 32a, 32b, the projector lens 41 and the pair of photosensitive element arrays 72a, 72b is identical to the optical system of FIG. 6. Thus, while the arrangement of FIG. 8a is optically equivalent to that of FIG. 6, in the actual construction shown in FIG. 8a the split prism units 31a, 31b, which form the first refracting means and act as an image-forming means for forming at the image plane a pair of identical images of the object which is to be photographed, are situated in the central region of the illustrated semitransparent reflector means 213 and the surfaces of the split prism units 31a, 31b which face toward the left, as viewed in FIG. 8a, or in other words which face the objective means 21, are finished so as to form part of the semitransparent reflecting surface of the reflector means 213, so that these surfaces form part of the surface of the reflector means 213 in this construction. This construction is illustrated in greater detail in FIGS. 14 and 16 where the central portion of the reflector 213 is fragmentarily illustrated in FIG. 14 as it appears from FIG. 8a when looking upwardly toward the left from below and to the right of the mirror 213, or in other words when looking from the right of the mirror 213 and slightly below the latter toward the prism units 31a, 31b. Thus this construction will then appear at the central region of the mirror 213 as shown in FIG. 14, while FIG. 16 illustrates how in this particular case the prism units 31a, 31b form an integral part of the mirror 213 and have at their surfaces directed toward the objective portions which form an uninterrupted extension of the upper reflecting surface of the mirror 213, this reflecting surface of course being shown at the lower part of FIG. 16.

Figure 17:
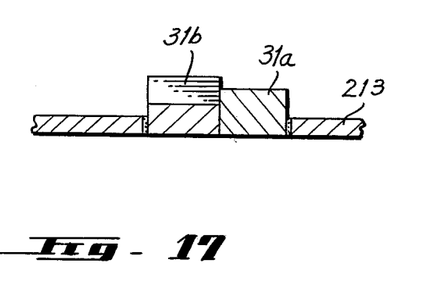
FIG. 17 is a sectional view similar to that of FIG. 16 but showing a different manner of connecting the split prism structure to the semitransparent reflector.

However, such a construction is not essential, and FIG. 17 shows an arrangement where the central portion of the reflector 213 is cut out and the prism units 31a, 31b are situated in the thus-formed opening almost filling the latter, while being fixed by a suitable adhesive to the mirror 213 along the edge of the opening therein into which the units 31a, 31b extend as shown in FIG. 17. In this construction the surfaces of the prism units 31a, 31b which are directed toward the objective are flush with the upper reflecting surface of the mirror 213, shown at the bottom part of FIG. 17, and are finished so as to also form a semitransparent reflecting surface, so that these flat coplanar surfaces of the prism units 31a, 31b of FIG. 17 form an extension of the reflecting surface of the mirror 213 in the embodiment of FIG. 17.

Figure 16:
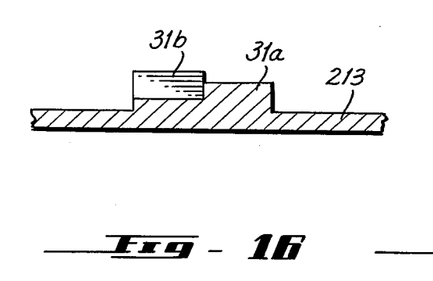
FIG. 16 is a sectional elevation of the structure of FIG. 14 taken along lines 16—16 of FIG. 14 in the direction of the arrows.
Figure 18:
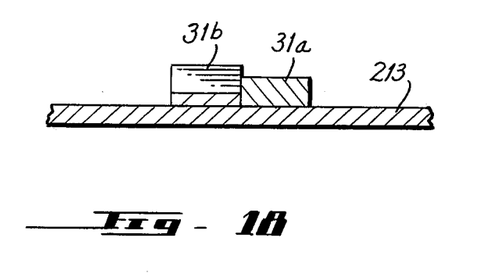
FIG. 18 is a sectional elevation also similar to FIG. 16 but showing yet a further manner in which a semitransparent reflector can have a split prism connected thereto in accordance with the invention.

However, instead of the arrangements shown IN FIGS. 16 and 17, it is also possible to utilize an arrangement as shown in FIG. 18 where the prism units 31a, 31b are fixed, as by any suitable transparent adhesive, to the non-reflecting surface of the mirror 213 which faces the film plane 210. Thus in FIG. 18 the lower surface of the mirror 213 is the upper reflecting surface thereof shown in FIG. 8a, this being the surface which faces the objective means 21, while the opposite non-reflecting surface which faces the film plane 210 has fixed thereto the prism units 31a, 31b, with the embodiment of FIG. 18.

Figures 14, 15:
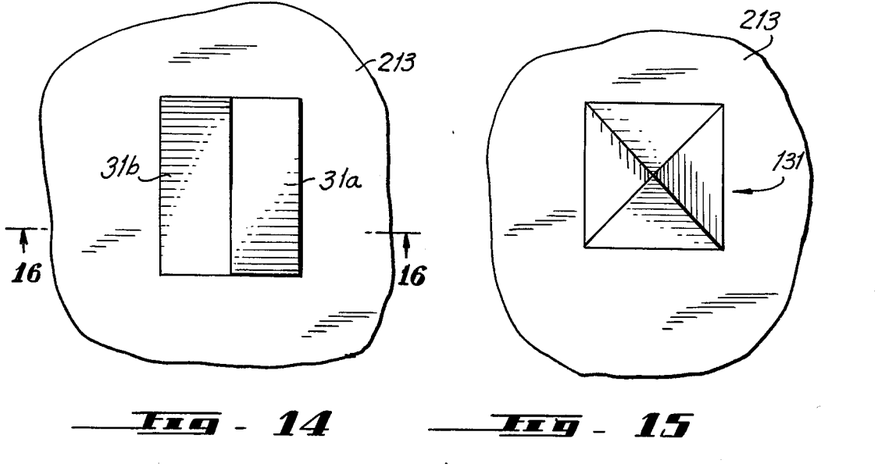
FIG. 14 is a fragmentary schematic illustration of part of a semitransparent reflector provided with a refracting means of the invention.
FIG. 15 shows in a fragmentary schematic illustration how a pyramidal prism is connected with the semitransparent reflector.

Of course it is possible to utilize as the first refracting means of the image-forming means the pyramidal prism 131 of FIG. 5 instead of the pair of prism units 31a, 31b, and in this case the pyramidal prism 131 will also be situated at the central region of the mirror 213 in the manner shown in FIG. 15, with this prism 131 being fixed to the mirror 213 as by being integral therewith, in a manner illustrated for the units 31a, 31b in FIG. 16, or the arrangement shown in FIGS. 17 and 18 may be utilized for situating the pyramidal prism 131 at the mirror 213.

Situated just behind the semitransparent reflector means 213 is a light-deflecting means 211 in the form of a totally reflecting mirror which serves to direct the luminous flux or light which has travelled through the mirror 213 and beyond the first refracting means 31a, 31b in the example of FIG. 8a along a second optical axis branching perpendicularly from the first optical axis of the objective means 21, and along this second optical axis are the second refracting means 32a, 32b, the projector lens 41, and the detecting plane where the pair of detecting means 72a, 72b are located. In the particular example shown in FIG. 8a the light-deflecting means 211 is fixedly carried by the mirror 213 at its right, non-reflecting surface and at its upper region, as viewed in FIG. 8a, so that the light will be deflected by the deflecting means 211 along the second optical axis as described above. It will be understood that although light deflecting means 211 is shown extending across the optical axis just prior to exposure of film at the film plane 210 the mirror 213 is in a known way swung upwardly about a horizontal axis so as to situate the mirror 213 and the light deflecting means 211 well above the optical axis. Thus the deflecting means 211 and mirror 213 will not interfere with exposure of film.

With the arrangement shown in FIG. 8a, the image plane, where the second refracting means 32a, 32b, which together with the projector lens 41 forms the image-transmitting means, for transmitting the images from the image plane to the detecting plane, is situated at a location which is optically equivalent to the location of the film plane 210. In other words the pair of prism units 32a, 32b which are situated at the image plane have a location which is optically equivalent to the location of the film plane 210.

Of course from the upper reflecting surface of the semitransparent reflector means 213 an image is directed upwardly to the viewfinder means which includes the focal plane component 214, the condenser lens 215, the pentaprism 216, the ocular 217, with the eye 218 of the operator being schematically shown in FIG. 8a.

Figure 8B:
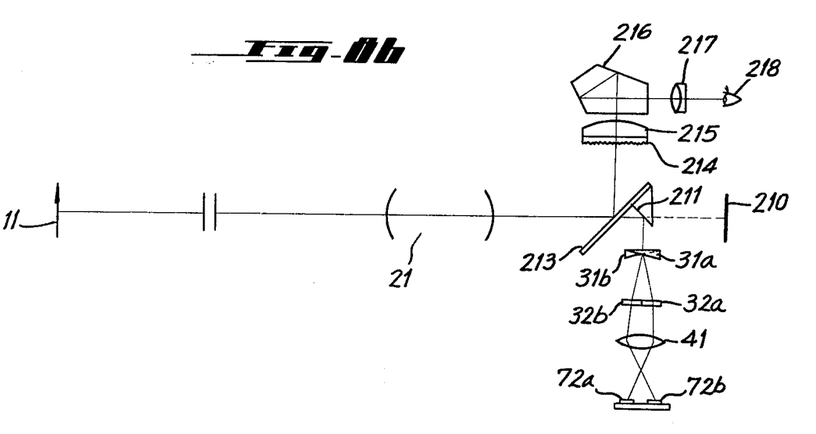
FIG. 8b is a schematical illustration of another possible arrangement according to the invention for indicating proper focus.

The embodiment of the invention which is illustrated in FIG. 8b is substantially identical with that of FIG. 8a and will achieve the same results. The difference is that in FIG. 8b the image-forming means formed by the first refracting means 31a 31b situated at the second optical axis between the light-deflecting means 211 and the second refracting means 32a, 32b, as illustrated. As is clear from FIG. 8b, the functioning of the device illustrated therein is assured even when the first refracting means 31a, 31b is mounted so as to remain stationary at the location shown in FIG. 8b, inasmuch as in the embodiment of FIG. 8b the second refracting means 32a, 32b is still located at a position which is optically equivalent to the position of the film plane 210, so that it is equally possible to situate the first refracting means 31a, 31b below the light-deflecting means 211 between the latter and the image plane where the second refracting means 32a, 32b is situated.

Figure 9:
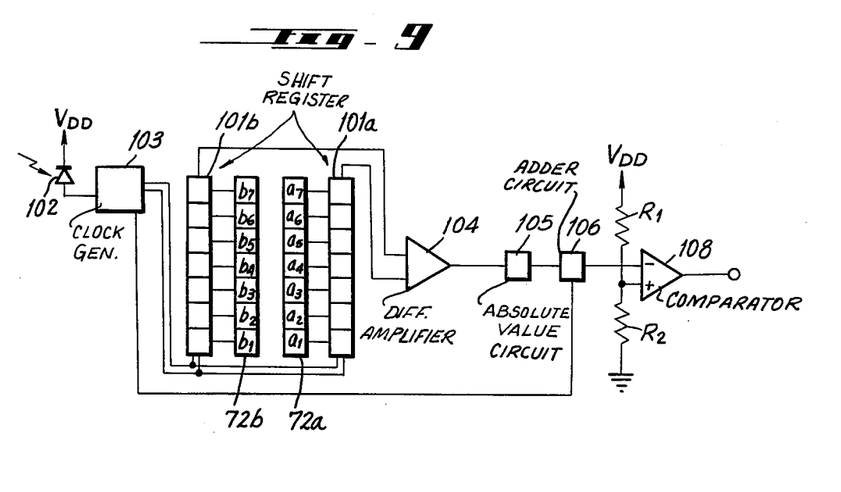
FIG. 9 is a schematic wiring diagram illustrating the electronic circuitry of an indicating means utilized with detectors of FIG. 6 for indicating proper focus of the objective.

An indicating means is operatively connected with the pair of detecting means 72a, 72b so as to indicate when the objective means 21 has properly focused an image at the film plane 10, and this indicating means takes the form of an electronic processing circuit which is illustrated in FIG. 9 and which is incorporated into the device of the present invention. This circuit will provide $$\sum_{k=1}^{7} |a_k - b_k|$$

as its output and includes a photosensitive element 102, which forms the input to a clock generator 103 which thus receives the output from the photosensitive element 102 and serves to modulate the clock frequency according to the brightness or luminance of the object which is to be photographed, so as to maintain in this way a predetermined output level. The illustrated circuitry includes a differential amplifier 104, two analog shift registers 101a and 101b driven by the output from the clock generator 103 and serving to apply signals to the two inputs of the differential amplifier 104, respectively, and of course the photosensitive element arrays 72a, 72b are respectively connected to the analog shift registers 101a, 101b, as illustrated. An absolute value circuit 105 receives the output from the differential amplifier 104 and converts this output into a corresponding absolute value. An adder circuit 106 carries out the addition of the output from the absolute value circuit 105 in synchronism with the clock generator 103, and a comparator 108 has one input in the form of the output from the adder 106 and another input to which a constant voltage is supplied. As the shift registers 101a and 101b use is made of charge transfer elements (CCD, BBD), and the outputs thereof are so arranged that outputs equivalent to the photo-outputs of the respective pairs of photosensitive elements may be simultaneously generated. Thus, the output of the differential amplifier 104 corresponds to the value $a_k - b_k$ (k = 1, 2, ... 7) which is converted by the absolute value circuit 105 into $|a_k - b_k|$. Then, the adder circuit 106 provides as its output $$\sum_{k=1}^{7} |a_k - b_k|.$$

The output of the comparator 108 is inverted when the output voltage of the adder 106 drops below $V_{DD} \times R_2/(R_1 + R_2)$, and then provides a signal indicative of the properly focused condition, where $V_{DD}$ represents the source voltage and $R_1$, $R_2$ represent resistance values, respectively.

Figure 10:
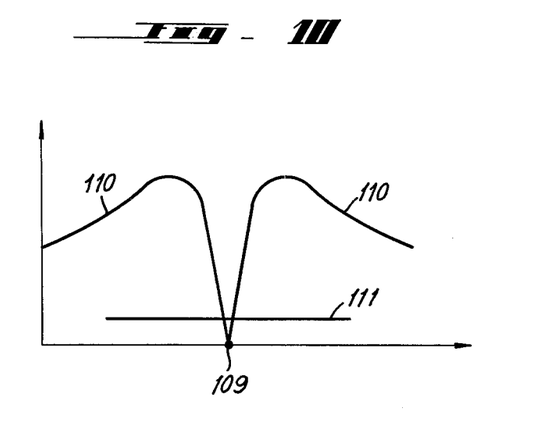
FIG. 10 is a graph illustrating how the invention operates.

The graph of FIG. 10 illustrates diagrammatically the voltage at the ordinate and the advance of the objective at the abscissa. The curve 110 represents the output voltage of the adder circuit 106, namely, $$\sum_{k=1}^{7} |a_k - b_k|.$$

The straight line 111 shown in FIG. 10 represents the voltage of $V_{DD} \times R_2/(R_1 = R_2)$. The point 109 in FIG. 10 is that point at which the output voltage of the adder 106 becomes zero as the objective has been displaced along its optical axis. In FIG. 10 the area to the left of the point 109 corresponds to conditions where the image is improperly focused beyond the film plane while the area to the right of the point 109 represents conditions where the image is improperly focused in front of the film plane. It will be seen that the curve 110 extends upwardly from the point 109, having a V-shaped configuration, and then from its uppermost portions the curve 110 goes downwardly on both sides as the distance beyond the point 109 increases, so that these curves represent the operation as the extent of deviation from proper focusing increases. Thus, excessive deviation from proper focusing reduces the voltage after it has increased inasmuch as the output voltage differential of each pair of corresponding photosensitive elements of the pair of arrays 72a, and 72b drops due to the reduction of the image contrast on the photosensitive elements.

Of course, in the case where the pyramidal prism 131 is utilized as the first refracting means which forms the image-forming means, there will be more than two images at the image plane, and of course in this case the image-transmitting means will transmit the several images to the detecting plane where the number of photosensitive element arrays or, in other words, the number of detecting means, as well as the number of units of the electronic processing circuit are provided so as to correspond to the number of images transmitted to the detecting plane so as to assure the desired detection of proper or improper focusing. Thus, as shown in FIG. 5, at the image plane 161 there are the illustrated four images 161a-161d, and for such an arrangement the second refracting means will include at the image plane four prism units which transmit the images to four elongated detecting means each of which has a linearly arranged group of photosensitive elements as described above. For example, the arrangement may include at the image plane 161 a central pair of prism units similar to the units 32a and 32b but arranged vertically with their thicker ends engaging each other while their opposed sharp ends are most distant from each other, so that in this way the upper and lower images 161c and 161d will be moved vertically simultaneously in opposite directions along a pair of arrays similar to the arrays 72a, 72b, but arranged one above the other in a vertical line in the same way as the pair of prism units which receive these images 161c and 161d. On opposite sides of this vertical pair of prism units are the pair of units 32a, 32b which are arranged as shown in FIG. 6 but which are spaced from each other by the central pair of vertically arranged units, so that with such an arrangement the lateral pair of units 32a and 32b will cooperate with the images 161a and 161b, respectively, to transmit the same to a pair of photosensitive element arrays 72a, 72b as described above. Of course with such an arrangement there will be four shift registers electrically connected with the four elongated detecting means and connected into a circuit as illustrated in FIG. 9.

The split prism units 31a, 31b are shown in FIG. 4a situated one above the other and directly engaging each other, and these units may be vertically displaced so as to vary in this way the relative luminance or brightness of the split images 61a, 61b, so that in this way it is possible to adjust the brightness or luminance of these images. Furthermore, these split prism units 31a, 31b may be displaced apart from each other so as to adjust the distance between the images 61a and 61b at the image plane. Of course, the spacing between the prism units 32a, 32b, then corresponds to this distance between the images 61a, 61b so as to properly receive these images for transmitting the same to the detecting plane as described above. Furthermore, the output signal of the signal-processing circuit shown in FIG. 9, which forms the indicating means, may be used as an input to drive a servo mechanism by means of which the focusing objective means is automatically carried out, and this output signal may be utilized to illuminate a display means such as a lamp so that an indication can be visually provided when conditions of proper focusing have been achieved. Thus, the output of the comparator 108 may be utilized to drive a servo mechanism which will operate in this way with an indication being given as by way of a lamp so as to indicate proper focusing.

Figure 11:
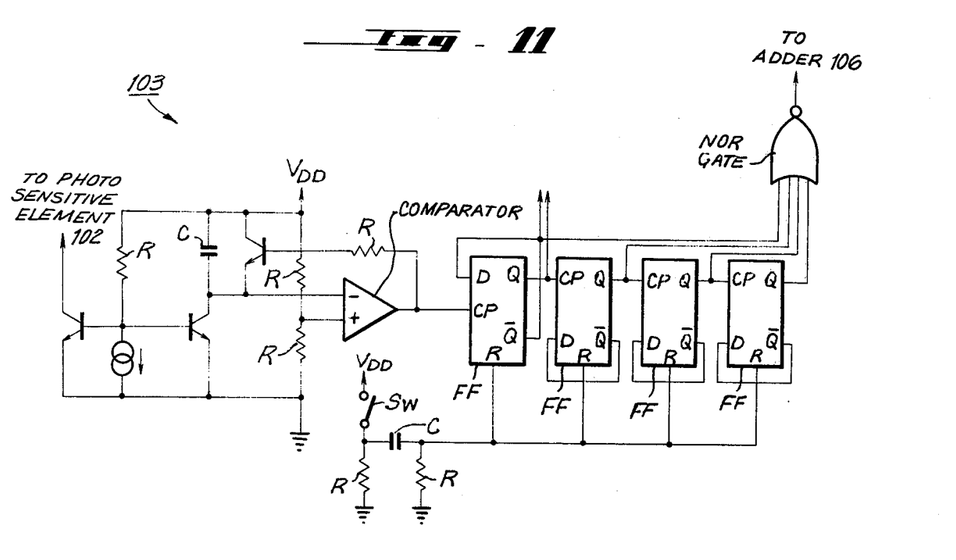
FIG. 11 is a more detailed wiring diagram showing the electronic circuitry of a clock generator of FIG. 9.

FIG. 11 illustrates one example of the circuitry of the clock generator 103 in practical form, this circuitry including the various resistors R, the switch Sw, and the illustrated flip flop circuits FF. In addition there are of course the illustrated capacitors C and the conductors connecting this circuitry with the shift registers and with the adder 106, the latter conductor being connected to a NOR gate as illustrated.

Figure 12:
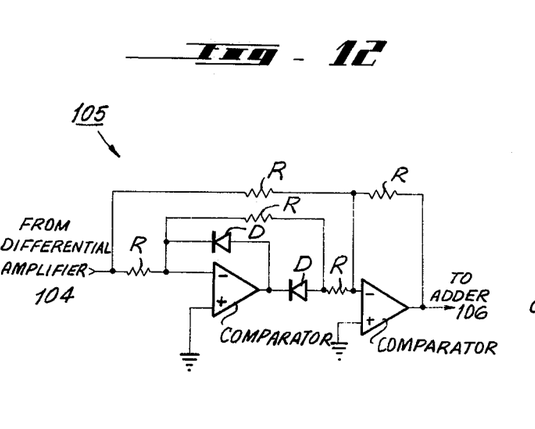
FIG. 12 is a wiring diagram illustrating the electronic circuitry of an absolute value circuit of FIG. 9.

FIG. 12 illustrates the circuitry of the absolute value circuit 105 of FIG. 9, this circuit of FIG. 12 showing in practical form how the absolute value circuit 105 is constructed. As is apparent from FIG. 12 this circuitry includes the illustrated resistors R and diodes D as well as the illustrated comparators, with the output of course being delivered to the adder circuit 106 while the input is received from the differential amplifier 104 as indicated.

Figure 13:
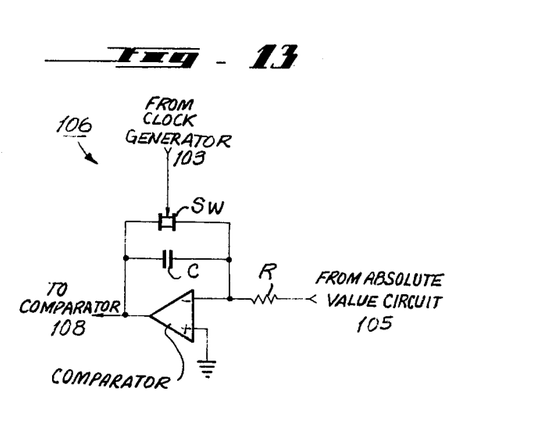
FIG. 13 is an electronic wiring diagram showing the circuitry of an adder of FIG. 9.

FIG. 13 illustrates a practical circuitry form of the adder circuit 106 of FIG. 9, the output from the clock generator 103 being delivered to the illustrated analog switch Sw, this circuitry including the illustrated resistor R, and the illustrated integrating capacitor C, as well as the illustrated comparator, with the output being delivered to the comparator 108 while the input is received from the absolute value circuit 105, as illustrated in FIG. 13.

The device of the invention which is described above and which operates in the manner described above provides a number of advantageous effects as referred to below.

Of course, all of the components of the device of the invention are limited to lenses, prisms and photosensitive elements, so that it is possible to manufacture the device in a compact size and with a light weight. In addition there are only relatively few components which tend to consume a large electrical power, so that the device can operate at a low level of power consumption. The focusing operation, for detecting proper focusing, can be carried out at high speed and with a high detection sensitivity, primarily because image deviation is utilized for focusing detection purposes. This rapid operation in connection with detection of proper focusing is facilitated also by the fact that silicon photodiodes, compound semiconductors, charge transfer elements, or image sensors of self-scanning type can be utilized for the photosensitive elements. Thus, each detecting means may include a photodiode array, and the indicating means formed by the circuit of FIG. 9 includes a self-scanning type of image sensing means operatively connected with these photodiode arrays for driving the same. However, each detecting means also may include an array of photosensitive elements in the form of charge transfer elements.

Furthermore, since split prisms such as 31a, 31b or 32a, 32b are utilized as the light path splitter according to the invention, the structure of the invention is considerably simplified as compared to other constructions, and adverse effects of polarization are eliminated while proper adjustment of the luminance or brightness to which the photosensitive element arrays are exposed can easily be achieved. More specifically, the luminance or brightness to be detected by the photosensitive element arrays 72a, 72b can be adjusted by vertically displacing the prism units 31a, 31b. The luminance light loss of the optical system is small in the focusing detector of the invention and this advantage also results in a high degree of sensitivity of detection.

What is claimed is:

1. In a single lens reflex camera, objective means having a first optical axis for focusing an image of an object which is to be photographed in a film plane which is normal to said first optical axis, view finder means, and semitransparent reflector means extending across said first optical axis between said objective means and film plane for reflecting an image of the object to said view finder means while permitting an image also to be focused by said objective means at said film plane, light-deflecting means situated behind said reflector means between the latter and said film plane for deflecting light traveling through said semitransparent reflector means from said first optical axis to a path extending along a second optical axis which branches from said first optical axis, and a device for determining when said objective means has properly focused an image at said film plane, said device comprising an optical system situated at least in part along said second optical axis and including along said second optical axis an image plane normal to said second optical axis and having at said second optical axis a location which is optically equivalent to the location of said film plane along said first optical axis, said optical system including in advance of said image plane at least at one of said optical axes an image-forming means including a first refracting means for receiving an image from said objective means and for providing therefrom at least a pair of identical images of the object to be photographed at said image plane, and said optical system having beyond said image plane along said second optical axis a detecting plane also normal to said second optical axis and at said detecting plane at least a pair of identical elongated photosensitive detecting means which have respectively optically equivalent positions with respect to said second optical axis, each of said detecting means providing an output which varies as an image is moved longitudinally along each detecting means, said optical system including an imagetransmitting means situated at least in part at said image plane including a second refracting means situated at said image plane for receiving each of said identical images of the object to be photographed from said first refracting means and for participating in the transmission thereof to said detecting plane in a manner according to which said identical images of the object to be photographed simultaneously move equally in opposite directions along said pair of detecting means in response to adjustment of said objective means to focus an image at said film plane, said pair of detecting means providing equal outputs when the images at said pair of detecting means are respectively situated at identical positions with respect thereto and different outputs when said images at said pair of detecting means are respectively situated at different positions with respect thereto, and the image transmitted by said objective means to said film plane being properly focused at said film plane when the pair of images at said pair of detecting means are respectively at the same positions with respect thereto, and indicating means operatively connected with said pair of elongated detecting means for indicating that when the identical transmitted to said pair of elongated detecting means are respectively situated at identical positions therealong, this indicating when said objective means has been set to focus an image properly at said film plane.

2. The combination of claim 1 and wherein said indicating means is operatively connected with said pair of detecting means for determining the difference between the outputs thereof so that when the latter difference is zero, an image is properly focused at said film plane by said objective means.

3. The combination of claim 1 and wherein said imagetransmitting means also includes a projector lens means situated between said second refracting means and said detecting plane for participating in the transmission of the images from said image plane to said detecting plane.

4. The combination of claim 1 and wherein said first refracting means is situated at said second optical axis between said light-deflecting means and image plane.

5. The combination of claim 1 and wherein said first refracting means is situated at said first optical axis between said objective means and said light-deflecting means.

6. The combination of claim 5 and wherein said first refracting means is situated at said semitransparent reflector means.

7. The combination of claim 6 and wherein said semitransparent reflector means has a reflecting surface by which an image received from said objective means is reflected to said viewfinder means, and said first refracting means having a semitransparent reflecting surface situated in the same plane as and forming part of the reflecting surface of said semitransparent reflecting means.

8. The combination of claim 6 and wherein said semitransparent reflector means has a pair of opposed surfaces one of which faces said objective means and the other of which faces said film plane, and said first refracting means being situated at said surface of said semitransparent reflector means which faces said film plane.

9. The combination of claim 1 and wherein said first refracting means includes a split prism having a pair of identical but oppositely directed prism portions.

10. The combination of claim 1 and wherein said first refracting means includes a pyramidal prism for providing at said image plane more than two identical images of the object which is to be focused at said film plane by said objective means.

11. The combination of claim 1 and wherein each detecting means includes a photodiode array, and said indicating means including a self-scanning type of image sensing means operatively connected with said photodiode arrays for driving the same.

12. The combination of claim 1 and wherein each detecting means includes an array of photosensitive elements in the form of charge transfer elements.

13. The combination of claim 1 and wherein said image-forming means is carried by said semitransparent reflector means.

* * * * *